US012743054B2

(12) United States Patent
Suizu

(10) Patent No.: US 12,743,054 B2
(45) Date of Patent: Sep. 22, 2026

(54) WATCH WITH MECHANISM FOR ABSORBING EXTERNAL SHOCKS

(71) Applicant: CASIO COMPUTER CO., LTD., Tokyo (JP)

(72) Inventor: Takashi Suizu, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 557 days.

(21) Appl. No.: 18/063,799

(22) Filed: Dec. 9, 2022

(65) Prior Publication Data

US 2023/0195043 A1 Jun. 22, 2023

(30) Foreign Application Priority Data

Dec. 22, 2021 (JP) ................................ 2021-208058

(51) Int. Cl.
*G04C 3/00* (2006.01)
*G04C 1/06* (2006.01)

(52) U.S. Cl.
CPC ............... *G04C 3/004* (2013.01); *G04C 1/06* (2013.01)

(58) Field of Classification Search
None
See application file for complete search history.

(56) References Cited

U.S. PATENT DOCUMENTS

| | | | | |
|---|---|---|---|---|
| 2017/0068220 A1* | 3/2017 | Hosobuchi | ............. | G04R 60/14 |
| 2024/0427291 A1* | 12/2024 | Shimokawa | ......... | G04B 19/044 |
| 2026/0118824 A1* | 4/2026 | Suizu | .................. | G04B 19/044 |

FOREIGN PATENT DOCUMENTS

| | | | |
|---|---|---|---|
| JP | S5028363 | A | 3/1975 |
| JP | S5046162 | A | 4/1975 |
| JP | S5456863 | A | 5/1979 |
| JP | S62245988 | A | 10/1987 |
| JP | H06258459 | A | 9/1994 |
| JP | H0741488 | U | 7/1995 |
| JP | H1048351 | A | 2/1998 |
| JP | 2001145309 | A | 5/2001 |
| JP | 2008232732 | A | 10/2008 |

OTHER PUBLICATIONS

Translation of JP2008232732, Espacenet (Year: 2008).*
Translation of JPH1048351, Espacenet (Year: 1996).*
Translation of JPS5028363, Espacenet (Year: 1975).*
Notice of Reasons for Refusal dated Dec. 5, 2024 received in Japanese Patent Application No. JP 2021-208058.
Decision of Refusal dated Mar. 12, 2024 received in Japanese Patent Application No. JP 2021-208058.
Notice of Reasons for Refusal dated Dec. 5, 2023 received in Japanese Patent Application No. JP 2021-208058.

* cited by examiner

*Primary Examiner* — Renee S Luebke
*Assistant Examiner* — Matthew Daniel Hwang
(74) *Attorney, Agent, or Firm* — Scully, Scott, Murphy & Presser, P.C.

(57) ABSTRACT

A watch according to an embodiment of the present disclosure includes a first pointer, a first magnetic body fixed to the first pointer, a second magnetic body arranged facing the first magnetic body, a first shaft body fixed to the second magnetic body, and a wheel train mechanism including a first rotary wheel interlocked with the first shaft body.

12 Claims, 3 Drawing Sheets

WATCH WITH MECHANISM FOR ABSORBING EXTERNAL SHOCKS

CROSS-REFERENCE TO RELATED APPLICATIONS

This application is based upon and claims the benefit of priority from the prior Japanese Patent Application No. 2021-208058, filed Dec. 22, 2021 the entire contents of which are incorporated herein by reference.

FIELD

Embodiments described herein relate generally to a watch.

BACKGROUND

In a watch, such as a wristwatch, a watch module with various components is housed in the interior of a case. The watch module includes a dial, pointers such as minute and hour hands, a wheel train mechanism, a drive source, etc. The wheel train mechanism includes a plurality of gear members such as a so-called fourth wheel, second wheel, and scoop wheel, and shafts of these fourth wheel, second wheel, and scoop wheel are provided with a second hand, a minute hand, and an hour hand, which are pointers, respectively (see, for example, Japanese Patent Application KOKAI Publication No. H6-258459).

SUMMARY

A watch according to an embodiment of the present disclosure includes a first pointer, a first magnetic body fixed to the first pointer, a second magnetic body arranged facing the first magnetic body, a first shaft body fixed to the second magnetic body, and a wheel train mechanism including a first rotary wheel interlocked with the first shaft body.

DETAILED DESCRIPTION

First Embodiment

Figure 1:
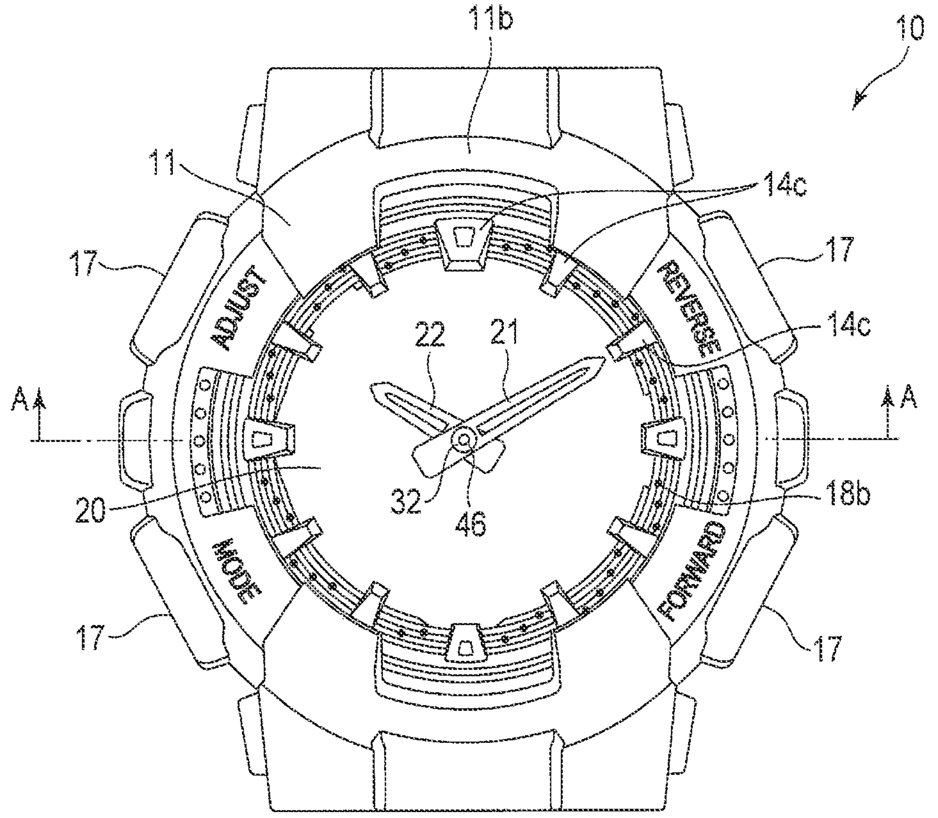
FIG. 1 is a plan view showing a configuration of a watch according to a first embodiment.
Figure 2:
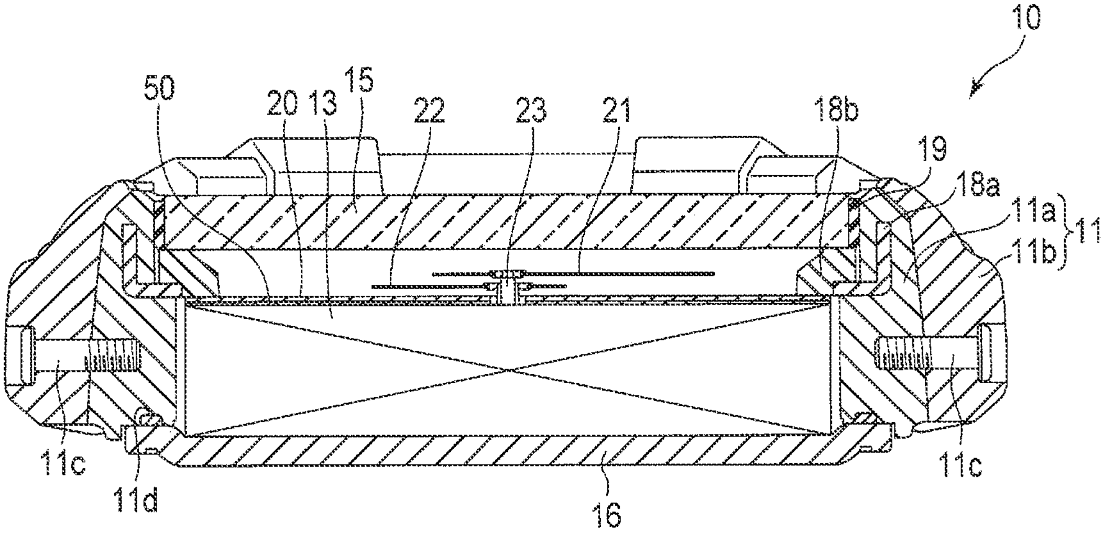
FIG. 2 is a cross-sectional view showing a configuration of the watch.
Figure 3:
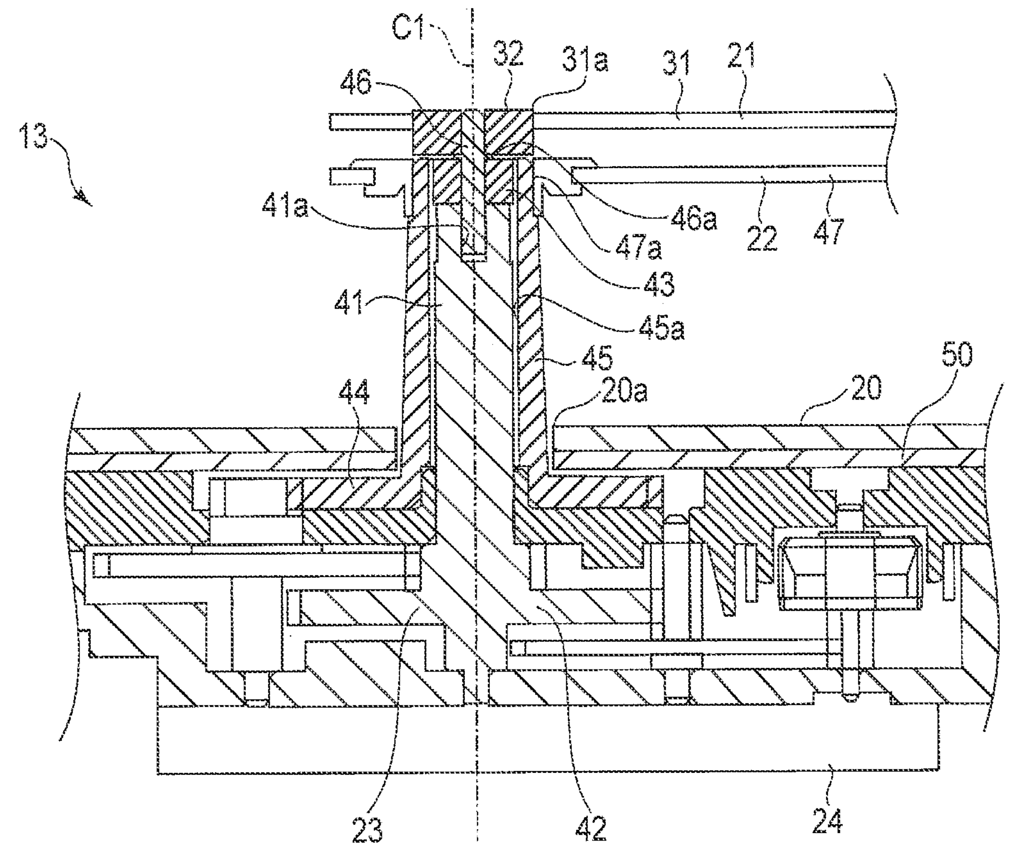
FIG. 3 is an explanatory view showing configurations of pointers and a wheel train mechanism of the watch.
Figure 4:
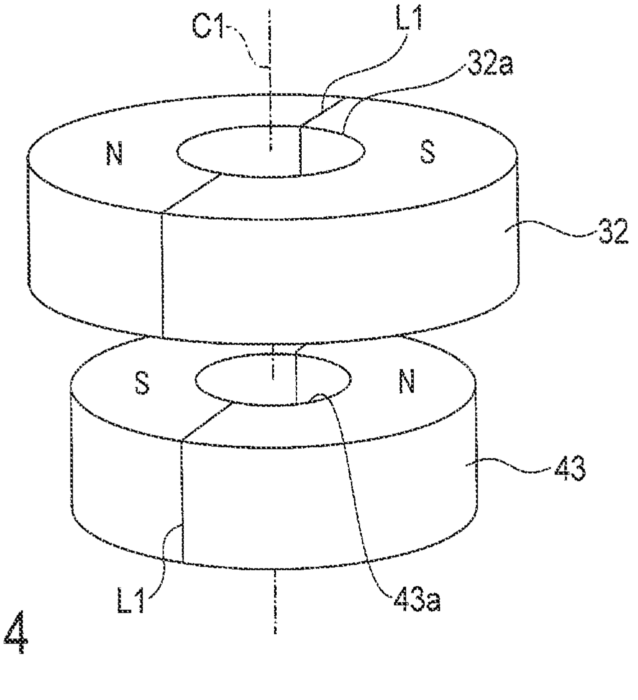
FIG. 4 is an explanatory view showing configurations of magnetic bodies of the watch.

In the following, a configuration of a watch 10 according to a first embodiment of the present disclosure will be described with reference to FIGS. 1 to 4. FIG. 1 is a plan view showing a configuration of the watch according to the first embodiment, and FIG. 2 is a cross-sectional view showing a configuration of the watch. FIG. 3 is an explanatory view showing configurations of pointers and a wheel train mechanism of the watch, and FIG. 4 is an explanatory view showing configurations of magnetic bodies of the watch. In each figure, the configuration is shown in a schematic form, with enlargement, reduction, or omission as appropriate.

As shown in FIGS. 1 and 2, the watch 10 is, for example, a wristwatch, with a case 11 forming an outer contour, a watch module 13 provided inside the case 11, a watch glass 15 covering a front side of the watch module 13, a back lid 16 covering a back side of the watch module 13, and one or more switches 17 arranged around an outer periphery of the case 11.

The case 11 has an annular first case 11*a* and a second case 11*b* arranged outside the first case 11*a*.

The first case 11*a* is formed in an annular shape, and has a circular housing space housing the watch module 13, etc. inside.

A dial 20 of the watch module 13 is arranged in an upper opening of the first case 11*a*. A reinforcing member 18*a* and a parting member 18*b* are arranged at an outer peripheral portion of the dial 20 and at an inner peripheral edge of the first case 11*a*. A groove is formed on a back side surface of the first case 11*a*, and a waterproof ring 11*d* is attached to this groove to make it airtight with the back lid 16.

The second case 11*b* is provided around the outer periphery of the first case 11*a*. The second case 11*b* is fixed to the first case 11*a* by connecting members such as screws 11*c*.

The watch module 13 is housed in the housing space of the first case 11*a*. The watch module 13 includes the dial 20, an antimagnetic plate 50, a minute hand 21 as a first pointer, an hour hand 22 as a second pointer, a wheel train mechanism 23 as a power transmission unit, and a drive source 24. The watch module 13 further includes various components necessary for watch operation, such as a battery, a circuit board with electronic components such as an IC, and an antenna, depending on a drive system.

The dial 20 is formed in a disk shape, and is arranged at an upper portion within the housing space of the first case 11*a*. The dial 20 has a through hole 20*a* in the center where a first shaft body 41 and a second shaft body 45, which constitute a part of the wheel train mechanism 23, are inserted. The parting member 18*b* provided with various hour markings 14*c* is arranged at a front surface outer peripheral portion of the dial 20.

The minute hand 21 has a first hand body 31 formed to a predetermined width and length, and a driven magnet 32 as a first magnetic body.

The first hand body 31 is formed in, for example, an elongated plate shape, and has a first hand hole 31*a*, which is a through hole, at a proximal end portion of its rotation. An annular driven magnet 32 is fixed to the first hand hole 31*a* of the first hand body 31. The first hand body 31 is rotatable about a rotation axis C1 on the dial 20 in the housing space.

The first hand body 31 is connected to the drive source 24 via the wheel train mechanism 23, and makes a rotational movement so that its longitudinal direction points in a direction corresponding to a time to be displayed.

As shown in FIG. 4, the driven magnet 32 is formed in, for example, an annular shape having a shaft hole 32*a* in the center. The driven magnet 32 is constituted of a ferromagnetic body such as samarium cobalt, for example. The driven magnet 32 is magnetized in a radial direction, and has two different poles in a circumferential direction. For example, one side is polarized to the S-pole and the other side to the N-pole, bounded by a radial polarization line L1 passing through the center. The driven magnet 32 is rotatably supported by a support member 46, which is a part of the wheel train mechanism 23, inserted into the shaft hole 32*a*.

The wheel train mechanism 23 includes a plurality of gear members that are arranged appropriately according to the arrangement of the drive source 24, the minute hand 21, and the hour hand 22. As an example, the wheel train mechanism 23 has at least a gear 42 for the minute hand as a first rotary wheel having the first shaft body 41 that engages the minute hand 21, a drive magnet 43 as a second magnetic body provided in the gear 42 for the minute hand, a gear 44 for the hour hand as a second rotary wheel having a second shaft body 45 that engages the hour hand 22, and a support member 46 as a support member. The wheel train mechanism 23, together with the drive source 24, constitutes a movement that moves the hands 21 and 22.

The gear 42 for the minute hand is a gear member referred to as a so-called second wheel, and has at its center of rotation the first shaft body 41 extending along a rotation axis C1. The gear 42 for the minute hand is rotated by the drive source 24 to rotate the minute hand 21.

The first shaft body 41 is a rod-like member extending in a predetermined first direction, and is fixed to the center of rotation of the gear 42 for the minute hand. Depending on its arrangement relationship with other members, the first shaft body 41 may be formed in a cylindrical shape having a through hole in the center through which another shaft member can be inserted. The first shaft body 41 may be provided integrally with the gear 42 for the minute hand, or may be constituted of a separate member. The first shaft body 41 may be fixed to the gear 42 for the minute hand, or may be interlocked without being fixed to the gear 42 for the minute hand.

A hole portion 41*a* is formed at a distal end portion of the first shaft body 41 into which the support member 46 is inserted and fixed. The hole portion 41*a* is, for example, a bottomed concave portion that opens toward the distal end side of the first shaft body 41, i.e., a front side of the watch 10. The support member 46 is inserted into the hole portion 41*a* and fixed.

The support member 46 is a shaft member with a diameter smaller than that of the first shaft body 41. The support member 46 is inserted and fixed in the hole portion 41*a* of the first shaft body 41, and is supported coaxially with the first shaft body 41.

The support member 46 is fixed to the first shaft body 41 and also fixes the driven magnet 32. The support member 46 is arranged in the shaft hole 32*a* of the driven magnet 32 and a shaft hole 43*a* of the drive magnet 43. The support member 46 supports the driven magnet 32 in a rotatable manner, and regulates a radial movement of the rotation of the driven magnet 32.

The support member 46 has a brim-shaped regulation member 46*a* protruding in the outer peripheral direction, for example, at a predetermined portion on an outer peripheral surface. The regulation member 46*a* is a projection having a predetermined thickness, and is interposed between the driven magnet 32 and the drive magnet 43 to define an axial gap between the driven magnet 32 and the drive magnet 43. For example, a thickness dimension of the regulation member 46*a* is set to a dimension that ensures a necessary holding force by magnetism.

The drive magnet 43 is press-fitted and fixed to a back side portion of the regulation member 46*a* of the support member 46, in other words, to a portion between a distal end surface of the first shaft body 41 and the regulation member 46*a*. On the other hand, the driven magnet 32 is rotatably attached to a front side portion of the regulation member 46*a*, in other words, to a portion on the distal end side over the regulation member 46*a*. In other words, the regulation member 46*a* supports the driven magnet 32 rotatably at a predetermined distance from the drive magnet 43, and regulates a position of the driven magnet 32 in the radial direction.

As shown in FIG. 4, the drive magnet 43 is formed, for example, in an annular shape having the axial hole 43*a* in the center, and is arranged coaxially with the driven magnet 32. The drive magnet 43 is constituted of a ferromagnetic body such as samarium cobalt, for example. The drive magnet 43 is arranged facing a back side of the driven magnet 32 with the regulation member 46*a* sandwiched therebetween in the axial direction.

The drive magnet 43 is magnetized in the radial direction, and has two different poles in the circumferential direction. For example, one side is polarized to the S-pole and the other side to the N-pole, bounded by the radial polarization line L1 passing through the center. The drive magnet 43 is press-fitted and fixed to the first shaft body 41, and rotates with the first shaft body 41. The support member 46, which is a part of the wheel train mechanism 23, is arranged in the shaft hole 43*a* of the drive magnet 43. For example, the drive magnet 43 may be fixed to the support member 46 by fitting or adhesion.

The drive magnet 43 is arranged facing the driven magnet 32, and holds the driven magnet 32 in a rotating position where their S- and N-poles attract each other. Therefore, in a stationary state, the driven magnet 32 and the minute hand 21 are held in the rotating direction where the S- and N-poles of the magnets attract each other, and the minute hand 21 rotates in synchronization with the rotation of the gear 42 for the minute hand during normal hand movement of the watch.

The hour hand 22 has a second hand body 47 formed to a predetermined width and length. For example, the second hand body 47 is formed in a predetermined shape that is shorter than the first hand body 31.

The second hand body 47 is formed in, for example, an elongated plate shape, and has a second hand hole 47*a* at a proximal end portion of its rotation. The second shaft body 45, which is a part of the wheel train mechanism 23, is fixed to the second hand hole 47*a* of the second hand body 47. The second hand body 47 is rotatable on the dial 20 in the housing space. The second hand body 47 is connected to the drive source 24 via the wheel train mechanism 23, and makes a rotational movement so that its longitudinal direction points in a direction corresponding to a time.

The gear 44 for the hour hand is a gear member referred to as a so-called scoop wheel, and has at its center of rotation the second shaft body 45 extending along the rotation axis C1 integrally. The gear 44 for the hour hand is rotated by the drive source 24 to rotate the hour hand 22.

The second shaft body 45 is a hollow rod-like member extending in a predetermined first direction. The second shaft body 45 is formed in a cylindrical shape having a through hole 45*a* in the center through which the first shaft body 41 can be inserted. The second shaft body 45 is rotatably mounted on an outer periphery of the first shaft body 41. The second shaft body 45 is integrally provided or fixed to a shaft center of the gear 44 for the hour hand.

The second hand body 47 is press-fitted and fixed to a distal end portion of the second shaft body 45. That is, the second hand body 47 rotates with rotation of the second shaft body 45.

For example, the minute hand 21, first shaft body 41, hour hand 22, and second shaft body 45 are made of non-magnetic materials.

The antimagnetic plate 50 is arranged adjacent to the dial 20 on a side opposite to the minute hand 21 as the first pointer and the hour hand 22 as the second pointer, to reduce an effect of magnetic flux from the drive magnet 43 and the driven magnet 32 on the watch module 13. The antimagnetic plate 50 is formed in a disk shape around the through hole 20*a* of the dial 20. The antimagnetic plate is formed by, for example, cold-reduced carbon steel sheets and strips (SPCC), etc.

The material used to form the antimagnetic plate 50 is not limited to SPCC, as long as the antimagnetic plate 50 can easily collect magnetic fields. For example, it may be formed with permalloy or the like.

The drive source 24 has one or more drive mechanisms. Various drive mechanisms, such as motors and spring mechanisms, can be used as the drive mechanisms, depending on the drive system of the watch 10. By transmitting power through the wheel train mechanism 23, a single drive mechanism may be used to drive the plural hands 21 and 22, or each of the hands 21 and 22 may have its own drive mechanism.

The watch glass 15 is a so-called windshield and formed in a transparent disk shape. The watch glass 15 is supported on the parting member 18*b* at the inner peripheral edge of the upper opening of the first case 11*a*, and covers the front side of the dial 20. The watch glass 15 is, for example, attached to the inner peripheral edge of the first case 11*a* via a packing 19.

The switches 17 are used by an operator to switch a mode of the watch module 13, correct the time, etc. by performing a push operation.

In the conventional support structure for hands, such as in Japanese Patent Application KOKAI Publication No. H6-258459, in a case where a watch is subjected to a shock from a fall or the like, a rotational moment generated by an imbalance of hands is transmitted to a movement constituted of a wheel train mechanism and a drive source via shafts of a fourth wheel, second wheel, and scoop wheel, causing damage to the movement or pointers to shift their pointing positions, resulting in time display deviation.

However, in the watch 10 in the present disclosure, the minute hand 21 and a part of the wheel train mechanism 23 are connected by the holding force of the magnets 32 and 43. The driven magnet 32 of the minute hand 21 is rotatably supported by the support member 46 of the first shaft body 41. Thus, the rotation of the minute hand 21 due to external shocks can be suppressed from being transmitted to the first shaft body 41. For example, if the watch 10 is subjected to a shock from a side surface direction due to a fall or the like, a moment in the rotating direction is generated in the minute hand 21, but no more rotary torque is applied to the gear 42 for the minute hand than a restraining force from the drive magnet 43 and the driven magnet 32 by their mutual magnetic force. Thus, in the case where a shock is applied to the minute hand 21, even if the minute hand 21 rotates due to this shock, the first shaft body 41 is prevented from rotating, thereby preventing the movement interior from being destroyed by rotation of the first shaft body 41 due to external force. Furthermore, damage to the gears caused by external force and damage to the movement caused by slippage or dislodging of the press-fit fixed portion of the hand can be prevented. For example, if a motor is used as the drive source 24, time display deviation due to stepping out of the motor's magnet can also be prevented.

According to the watch 10 of the above embodiment, even if a relative position of the drive magnet 43 and the driven magnet 32 is displaced by a shock, the magnetic force restores a positional relationship between the drive magnet 43 and the driven magnet 32 in the rotating direction, and thus an effect wherein the minute hand 21 is restored to its position before the shock was applied and the time display is adjusted can be obtained. The driven magnet 32 and the drive magnet 43 are arranged facing each other in the axial direction so that they do not interfere with each other's rotational movement.

Furthermore, the support member 46 provided in the first shaft body 41 saves space and allows the driven magnet 32 to be rotatably supported and regulated for a positional deviation in the radial direction. The regulation member 46*a* interposed between the driven magnet 32 and the drive magnet 43 creates a gap between the driven magnet 32 and the drive magnet 43 in the axial direction. That is, a friction caused by contact between the driven magnet 32 and the drive magnet 43 can be reduced, so that frictional force generated by the contact between the driven magnet 32 and the drive magnet 43 does not interrupt recovering of the minute hand 21.

The above-described embodiment has been presented by way of example only, and is not intended to limit the scope of the disclosure.

For example, the arrangement of the drive magnet 43 and the driven magnet 32 is not limited to the above example, and it suffices that a holding mechanism by a magnet is interposed at any portion from the pointer to the drive source 24.

Figure 5:
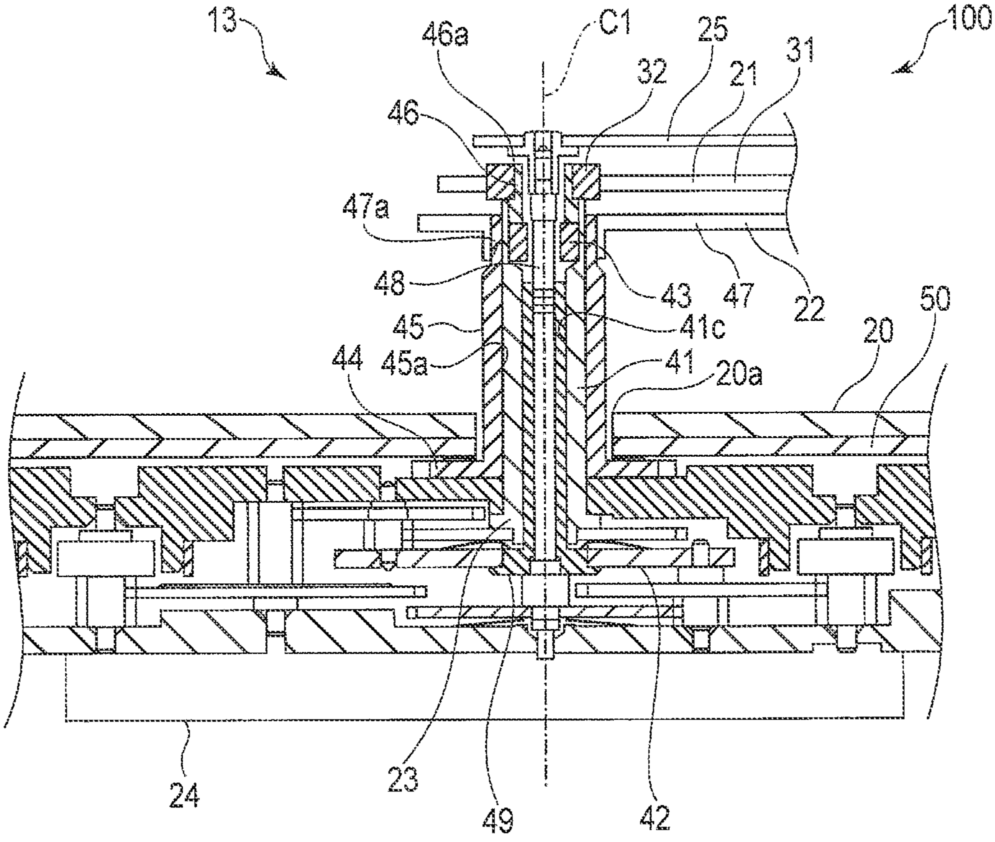
FIG. 5 is an explanatory view showing configurations of pointers and a wheel train mechanism of a watch according to another embodiment.

In the above embodiment, an example with a minute hand and an hour hand as pointers is indicated, but the present disclosure is not limited thereto and may include other pointers. For example, a watch 100 shown in FIG. 5 as another embodiment has a second hand 25 as a third pointer and, as a part of the wheel train mechanism 23, a gear 49 for the second hand as a third rotary wheel having a third shaft body 48 that drives the second hand 25. In this embodiment, the support member 46 is formed in a cylindrical shape having a hollow portion.

The gear 49 for the second hand is a gear member referred to as a so-called fourth wheel, and has at its center of rotation the third shaft body 48 extending along the rotation axis C1 integrally. The gear 49 for the second hand is rotated by the drive source 24 to rotate the second hand 25.

The third shaft body 48 is arranged coaxially with the first shaft body 41 and the second shaft body 45. In the present embodiment, the first shaft body 41, which is arranged in the center of the second shaft body 45, is formed in a cylindrical shape having a hollow portion 41*c*, and the rod-like third shaft body 48 is arranged in the hollow portion 41*c*. For example, the second hand 25 is arranged on the front side over the minute hand 21 and the hour hand 22. The second hand 25 and the third shaft body 48 are both made of materials that are non-magnetic in order to reduce the effect of magnetism and are also hard enough to withstand a weight of a press-fit at the time of fixing the second hand 25.

In the present embodiment, the support member 46 is formed in a cylindrical shape through which the third shaft body 48 can be inserted, and is fixed in the hollow portion of the first shaft body 41. The support member 46 has the regulation member 46*a* having a level difference that holds the driven magnet 32 rotatably. The other configurations are similar to those of the first embodiment described above.

The present embodiment produces effects similar to those of the first embodiment described above. That is, the minute hand 21 and the wheel train mechanism 23 are connected by the holding force of the magnets, thereby suppressing transmission of external shocks. The use of non-magnetic materials for the second hand 25 and the shaft body 48 can suppress the effect of magnetic force and allow the pointers to operate normally.

In the above-described embodiment, the second hand 25 as the third pointer and the third shaft body 48 are made of non-magnetic materials, but are not limited thereto. Instead of or in addition to the second hand 25 and the third shaft body 48, other members may be made of non-magnetic materials. For example, at least one of the minute hand 21, first shaft body 41, hour hand 22, second shaft body 45, second hand 25, and third shaft body 48, or other peripheral members may be made of non-magnetic materials.

In the above-described embodiment, an example is shown in which a holding structure with the magnets 32 and 43 is interposed in the support structure of the minute hand 21; however, the configuration is not limited thereto, and a configuration interposing a holding structure with magnets may be applied as a support structure for the hour hand, second hand, and other pointers.

In the above-described embodiment, the configuration in which the magnets 32 and 43 are polarized into two is shown, but the polarization structure is not limited to the above example. For example, they may be equally polarized into four.

The direction of polarization is not limited to the radial direction. For example, the magnets 32 and 43 may be polarized in the direction of their thickness, i.e., in the direction of their rotation axis. For example, of the axially facing drive and driven magnets, each magnet can be axially polarized so that a facing surface side of one magnet is the S-pole and a facing surface side of the other is the N-pole, which enables holding by attraction force.

The example in which the drive and driven magnets are made of hard magnetic materials is shown, but the configuration is not limited thereto. For example, one of them may be made of a soft magnetic material.

The example in which the driven magnet 32 and the drive magnet 43 are arranged facing each other in the axial direction is shown, but the configuration is not limited thereto. For example, one may be provided on an outer periphery of the other and they may be arranged facing each other in the radial direction.

while certain embodiments of the present disclosure have been described, the present disclosure is included in the scope of the claims and their equivalents.

What is claimed is:

1. A watch comprising:
- a first pointer;
- a first magnetic body fixed to the first pointer;
- a second magnetic body arranged facing the first magnetic body;
- a first shaft body configured to be rotated by a drive source; and
- a support member fixed to and extending from the first shaft body,
- wherein the first magnetic body and the second magnetic body are each polarized by being magnetized into two different poles,
- wherein one pole of the first magnetic body and the other pole of the second magnetic body are arranged facing each other,
- wherein the support member extends through a shaft hole of the first magnetic body and a shaft hole of the second magnetic body,
- wherein the support member has a brim-shaped regulation member protruding in an outer peripheral direction,

- wherein the support member fixes the second magnetic body to the first shaft body,
- wherein the support member is configured to not rotate with respect to the first shaft body,
- wherein the support member is configured to support the first magnetic body in a rotatable manner,
- wherein the first magnetic body is rotatably supported by the support member, and
- wherein the second magnetic body is press-fitted by the regulation member and the first shaft body and configured to not rotate with respect to the support member.

2. The watch according to claim 1, wherein the second magnetic body holds the first magnetic body by magnetism of the second magnetic body.

3. The watch according to claim 1, wherein the first magnetic body and the second magnetic body are arranged facing each other in an axial direction.

4. The watch according to claim 1, comprising a second pointer,
- wherein the wheel train mechanism includes a second rotary wheel having a second shaft body to which the second pointer is fixed, and
- wherein the first shaft body and the second shaft body are arranged coaxially.

5. The watch according to claim 4, comprising a third pointer,
- wherein the wheel train mechanism includes a third rotary wheel having a third shaft body to which the third pointer is fixed, and
- wherein the first shaft body, the second shaft body, and the third shaft body are arranged coaxially.

6. The watch according to claim 5,
- wherein the first pointer is a minute hand,
- wherein the second pointer is one of an hour hand and a second hand, and the third pointer is another one of the hour hand and the second hand, and
- wherein at least one of the first pointer, the first shaft body, the second pointer, the second shaft body, the third pointer, or the third shaft body is made of a non-magnetic material.

7. The watch according to claim 1, comprising:
- a dial arranged on a back side of the first pointer and the first magnetic body; and
- an antimagnetic plate arranged on a back side of the dial.

8. The watch according to claim 1, wherein the first magnetic body and the second magnetic body are samarium cobalt magnets.

9. The watch according to claim 1,
- wherein the first magnetic body and the second magnetic body have annular shapes respectively having shaft holes in the center, and
- wherein the first magnetic body and the second magnetic body are polarized in a circumferential direction of rotation by being each magnetized in a radial direction.

10. The watch according to claim 1,
- wherein the support member, the second magnetic body, and the first shaft body are configured to rotate together.

11. The watch according to claim 1,
- wherein the support member is inserted into, and fixed to, the first shaft body so as not to rotate with respect to the first shaft body.

12. The watch according to claim 1,
- the regulation member is smaller than the first magnetic body in a radial direction, and the first magnetic body rotates with a lower surface being in contact with the regulation member.

* * * * *